United States Patent
Marzolla et al.

(10) Patent No.: US 11,906,222 B2
(45) Date of Patent: Feb. 20, 2024

(54) METHOD FOR TESTING THE FUNCTIONAL STABILITY OF A REFRIGERATING MACHINE

(71) Applicant: CAREL INDUSTRIES S.p.A., Brugine (IT)

(72) Inventors: Luca Marzolla, Brugine (IT); Alex Badon, Brugine (IT)

(*) Notice: Subject to any disclaimer, the term of this patent is extended or adjusted under 35 U.S.C. 154(b) by 504 days.

(21) Appl. No.: 17/309,736

(22) PCT Filed: Dec. 16, 2019

(86) PCT No.: PCT/IB2019/060853
§ 371 (c)(1),
(2) Date: Jun. 16, 2021

(87) PCT Pub. No.: WO2020/128789
PCT Pub. Date: Jun. 25, 2020

(65) Prior Publication Data
US 2021/0381734 A1  Dec. 9, 2021

(30) Foreign Application Priority Data
Dec. 17, 2018  (IT) .......... 102018000011169

(51) Int. Cl.
*F25B 49/00* (2006.01)
*G07C 3/08* (2006.01)

(52) U.S. Cl.
CPC .......... *F25B 49/005* (2013.01); *G07C 3/08* (2013.01)

(58) Field of Classification Search
None
See application file for complete search history.

(56) References Cited

U.S. PATENT DOCUMENTS

| 5,491,649 A * | 2/1996 | Friday, Jr. ............ F24F 11/86 62/211 |
| 5,735,134 A | 4/1998 | Liu et al. |
| 2004/0230327 A1 | 11/2004 | Opheim et al. |

(Continued)

FOREIGN PATENT DOCUMENTS

WO 2018053910 A1 3/2018

OTHER PUBLICATIONS

Haynes, L., and A. Wavering. "Real-time control system software: Some problems and an approach." Proceedings. 1986 IEEE International Conference on Robotics and Automation. vol. 3. IEEE, 1986. (Year: 1986).*

(Continued)

*Primary Examiner* — Raymond L Nimox
(74) *Attorney, Agent, or Firm* — INNOVATION CAPITAL LAW GROUP, LLP; Vic Lin

(57) ABSTRACT

Method for testing the functional stability of a controller of a refrigerating machine where the controller performs control cycles. The testing method comprises a step (100) of recording a set of current values of input variables, status variables and output variables of the controller, and a subsequent execution step (200), in which the values of the status variables and input variables recorded in the recording step are forced in the controller as inputs and values of the output variables are recorded in order to compare them with the values of the output variables recorded in the recording step (100).

12 Claims, 2 Drawing Sheets

(56) References Cited

U.S. PATENT DOCUMENTS

| | | | |
|---|---|---|---|
| 2005/0055120 A1* | 3/2005 | Becker ................. | G05B 19/408 |
| | | | 702/187 |
| 2007/0156882 A1 | 7/2007 | McCoy et al. | |
| 2011/0022346 A1* | 1/2011 | Rossi .................. | H04L 12/2825 |
| | | | 702/182 |
| 2014/0343886 A1* | 11/2014 | Berinato ............ | G05B 23/0256 |
| | | | 702/123 |
| 2018/0031587 A1* | 2/2018 | Bierweiler ....... | G01N 35/00693 |
| 2018/0203428 A1* | 7/2018 | Thabuis ............... | G05B 19/058 |
| 2019/0340103 A1* | 11/2019 | Nelson ................ | G06F 11/3624 |

OTHER PUBLICATIONS

International Search Report & Written Opinion dated Mar. 23, 2020 from PCT Application No. PCT/IB2019/060853.

* cited by examiner

METHOD FOR TESTING THE FUNCTIONAL STABILITY OF A REFRIGERATING MACHINE

TECHNICAL SECTOR

The present invention relates to the sector of refrigerating machines and the control and operation thereof. In particular, the present invention relates to the testing of the functional stability of a controller of refrigerating machines such as chillers, deep freezers and bottle coolers and in general machines used in the HVAC-R sector.

It is understood, however, that the testing method according to the present invention is applicable to isothermal and adiabatic humidification machines, air conditioning machines and heat recovery machines. For the purposes of the present description, therefore, any reference to a refrigerating machine, in connection with the present invention, is to be understood as including the reference to such machines. Specifically, the controller will have a reduced processing capacity, as specified in more detail below, and will be unable to perform the recording of data.

BACKGROUND ART

A conventional controller has a series of inputs and outputs.

The inputs are intended for connection to active and passive devices such as temperature, humidity and pressure probes.

The outputs are intended to be connected to devices able to set or modify the operational state of the refrigerating machine and may be of the digital or analog type.

The controller is configured to perform cyclically an algorithm for checking the refrigerating machine, which, on the basis of the signals obtained from the inputs and the status variables, sets the signals at the outputs.

Generally, this algorithm is performed at predefined time intervals T which may be for example T=300 ms.

On average, control of the refrigerating machine, namely execution of the algorithm, requires a time equal to about 30-50 ms.

During control, the values read at the inputs are stable and at the end thereof the outputs are set and will maintain the set values until the next control cycle. Control is therefore performed as a discrete signal, namely a sequence of finite states which is repeated every T ms.

In this connection, it is known that during the working life of the refrigerating machine software modifications are performed in order to implement new functional features or modifications to the hardware thereof.

The software modifications may be for example intended to implement new functions of the algorithm for the control of further components or for the management of new inputs or communication devices.

The hardware modifications may relate to the modification or replacement of components of the refrigerating machine in order to improve the performance thereof or restore the functionality thereof in the event of maintenance.

As a result of these modifications, as is known, it is possible that a system regression may occur, namely a divergence of the refrigerating machine from the programmed or planned behaviour.

SUMMARY

In this context there exists an urgent need to solve the problem resulting from the adverse effects of said regression on the operation of the refrigerating machine.

One possible solution is that of detecting in good time a possible regression condition which could occur following the aforementioned software or hardware modifications.

The task of the present invention is therefore to propose a method for testing the functional stability of a controller of a refrigerating machine which is able to detect in good time a possible regression condition in a refrigerating machine. In connection with this task, an object of the present invention is that of providing a method for testing the functional stability of a controller of a refrigerating machine which is able to detect in good time a regression of the system in the case where the controller has very limited processing capacities.

A further object of the present invention is to propose a method for testing the functional stability of a controller of a refrigerating machine which is reliable also in the case where modifications of the refrigerating machine result in a variation, even substantial in nature, of the execution time of the control algorithm.

Studies carried out by the Applicant lead to the conclusion that by implementing a method for testing the functional stability of a controller of a refrigerating machine, involving carrying out a regression test following modifications to the hardware and/or software of the controller or the refrigerating machine in general, it is possible to detect in good time any regression of the system and therefore rectify the regression for example by performing an adjustment of the machine control algorithm.

In particular, the aforementioned task and objects are achieved by a method for testing the functional stability of a controller of a refrigerating machine according to the attached independent claim 1.

Advantageous aspects of a method for testing the functional stability of a controller of a refrigerating machine are indicated in the attached dependent claims.

Said claims, as filed, are incorporated herein for the purposes of specific reference.

DETAILED DESCRIPTION

With particular reference to the attached figures, these show, by way of a non-limiting example, aspects of a method for testing the functional stability of a controller of a refrigerating machine, according to the present invention, where said controller, for which status variables are set and which has inputs for input variables and outputs for output variables, carries out refrigerating machine control cycles.

In particular, the refrigerating machine may be a deep freezer or bottle cooler and the controller may be for example a parameter-based controller designed for such applications.

Figure 1:
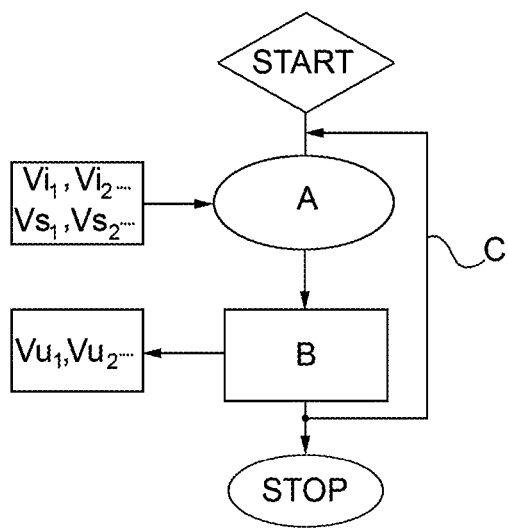
FIG. 1 illustrates the control cycle of a controller of a refrigerating machine.

With particular reference to FIG. 1, each of said control cycles may involve, in sequence, the following operations:

A acquiring values of said input variables, which represent functional conditions of the refrigerating machine, B executing an adjustment algorithm which, on the basis of the values of said input variables and said status variables, sets values for said output variables so as to adjust operation of the refrigerating machine;

C repeating operations A and B following lapsing of a control cycle time T from the start of operation A.

The testing method according to one aspect of the present invention may involve an operation of connecting the controller to a diagnostic unit for exchanging data therewith during operation of the controller.

In particular, this connection operation may involve a connection of said diagnostic unit to the inputs and the outputs of said controller in order to transmit data relating to said input variables and said output variables, as well as said status variables, to said diagnostic unit.

The diagnostic unit may consist of a PC.

The said testing method, according to an aspect of the present invention, may involve, during operation of the refrigerating machine, the implementation of a recording step 100 and a subsequent execution step 200 which may be carried out by the diagnostic unit.

Figure 2:
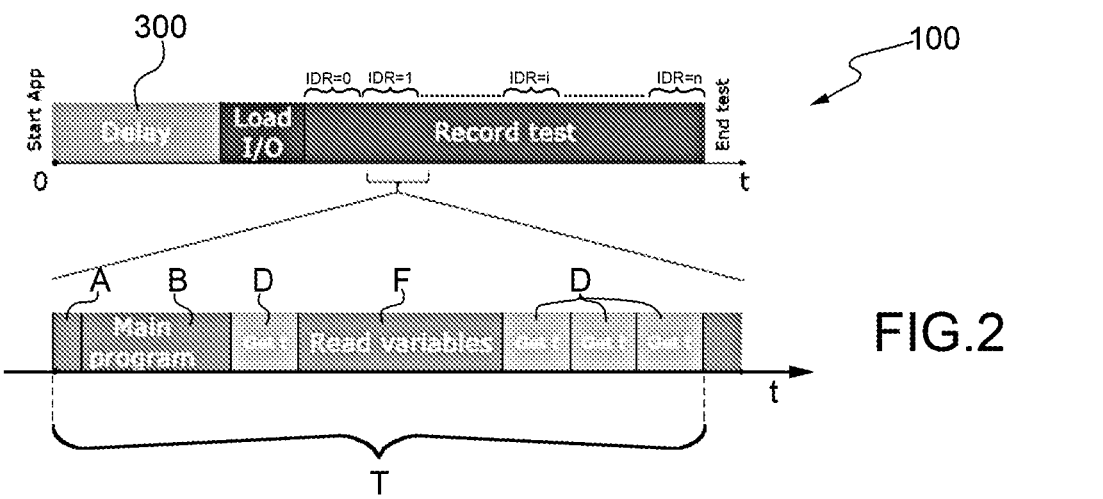
FIGS. 2 and 3 illustrate, respectively, a recording step and an execution step of a testing method according to the present invention.

The recording step 100, by way of a non-limiting example, is shown in FIG. 2 and may involve, in sequence:

an operation D which is carried out following operation B and which involves associating with a recording cycle identifier IDR a progressive value calculated starting from a start cycle which is the control cycle of the controller in which the recording step 100 is started and which, in the example shown in the figure, has IDR=0;

an operation F of recording a set of reference data which consists of a set of current values of said input variables, said status variables and said output variables; said recording step 100 further involving associating with each reference data set the recording cycle identifier IDR of the control cycle in which the reference data set was recorded;

repeating said operation D and said operation F for each control cycle until the end of the recording step 110 which, in FIG. 2, is indicated by the reference "end test".

In other words, the operation D may count the control cycles which are performed during the recording step and, in particular, associates with the recording cycle identifier IDR a progressive value, which in the case of FIG. 2 will vary from 0 to n.

It can therefore be understood that in general, "progressive value" may be understood as meaning a natural number, the value of which is defined by the number of control cycles counted starting from the start cycle.

The control cycle identifier IDT in which the reference data set was recorded may therefore be associated with each reference data set recorded in operation F.

Figure 3:
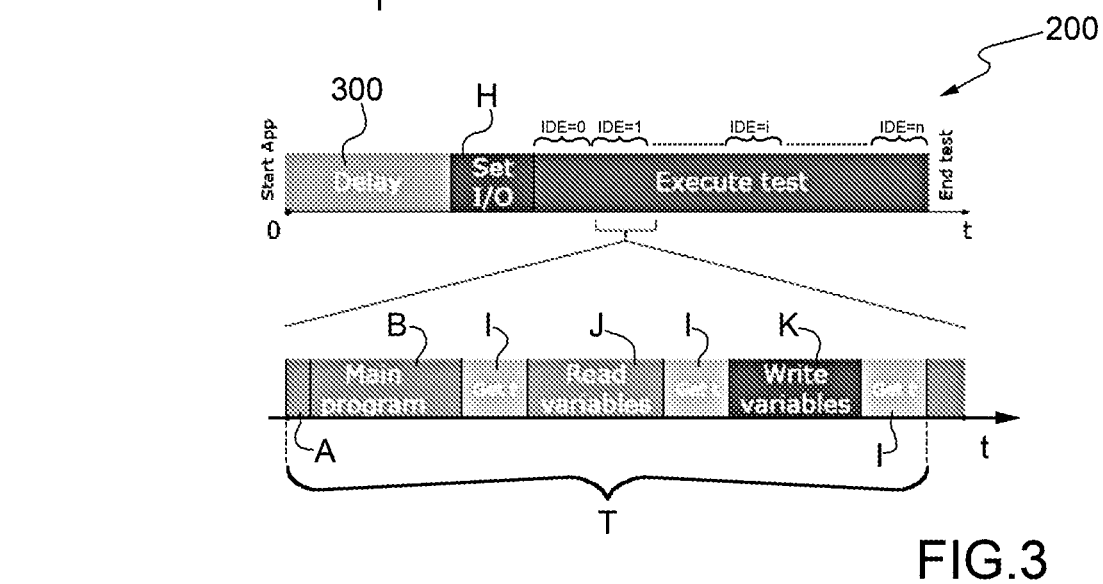

The execution step 200 may involve in sequence:

an initialization operation H in which, prior to the execution of the operation A, the current values received by the controller for the input variables and for the status variables are replaced by the values of the input variables and the status variables of the reference data set which was recorded in the operation F carried out in said start cycle c0; wherein the control cycle in which the operation H is performed is assumed as an initialization cycle; in this way, upon execution of the first operation A carried out during the execution step 200, the controller will adjust the refrigerating machine on the basis of the same values of the input variables and the status variables which were detected during the start cycle of the recording step;

an operation I of recording an execution cycle identifier IDE which involves associating with the execution cycle identifier a progressive value calculated starting from said initialization cycle, which in the example of FIG. 3 has IDE=0;

an operation J of recording, following operation B, a control data set, which comprises a set of current values of the output variables; wherein the execution step 200 also involves associating with each control data set the execution cycle identifier IDE in which the control data set was recorded;

a write operation K, in which the values of the input variables, and optionally of the status variables, of the reference data set which was recorded in operation F carried out in the control cycle having a recording cycle identifier IDR directly following the execution cycle identifier IDE recorded in the operation I, namely in the recording cycle having a recording cycle identifier IDR=IDE+1, are assigned to the values of the input variables, and optionally of the status variables, in such a way that, in operation A of the subsequent control cycle, the values of the input variables and status variables are those assigned in the operation F;

repeating operation I, operation J and operation K for each control cycle until the end of the execution step 200.

The testing method according to the present invention may comprise a comparison step in which the following will be compared:

the values of the output variables recorded in operation F of the recording step and the values of the output variables recorded in operation K of the execution step;

where this comparison is made between the values of the output variables recorded in operation F associated with a control cycle identifier IDR which is equal to the execution cycle identifier IDE associated with the values of the output variable values recorded in operation K and compared.

A divergence, exceeding a predefined threshold, between the values of the output variables recorded in operation F and the values of the output variables recorded in operation K, having IDR=IDE, may indicate a regression of the system and therefore the need for adaptation of the refrigerating machine control algorithm.

It can therefore be understood how, with the testing method according to the present invention, it is possible to carry out a recording step 100 and, after any hardware or software modification of the refrigerating machine or the controller, carry out an execution step and a comparison step in order to detect in good time any regression of the system and thus allow timely recovery of the functionality of the refrigerating machine and/or the controller.

With particular reference to FIGS. 2 and 3, the recording step 100 may involve operation D being repeated at least once following operation F, and the execution step 200 may involve operation I being repeated at least once following operation J and/or following operation K.

The controller may comprise a memory in which data relating to the input variables and the status variables are stored in each control cycle.

This data will have sizes and addresses in the aforementioned memory which remain fixed during the control cycles.

Figure 4:
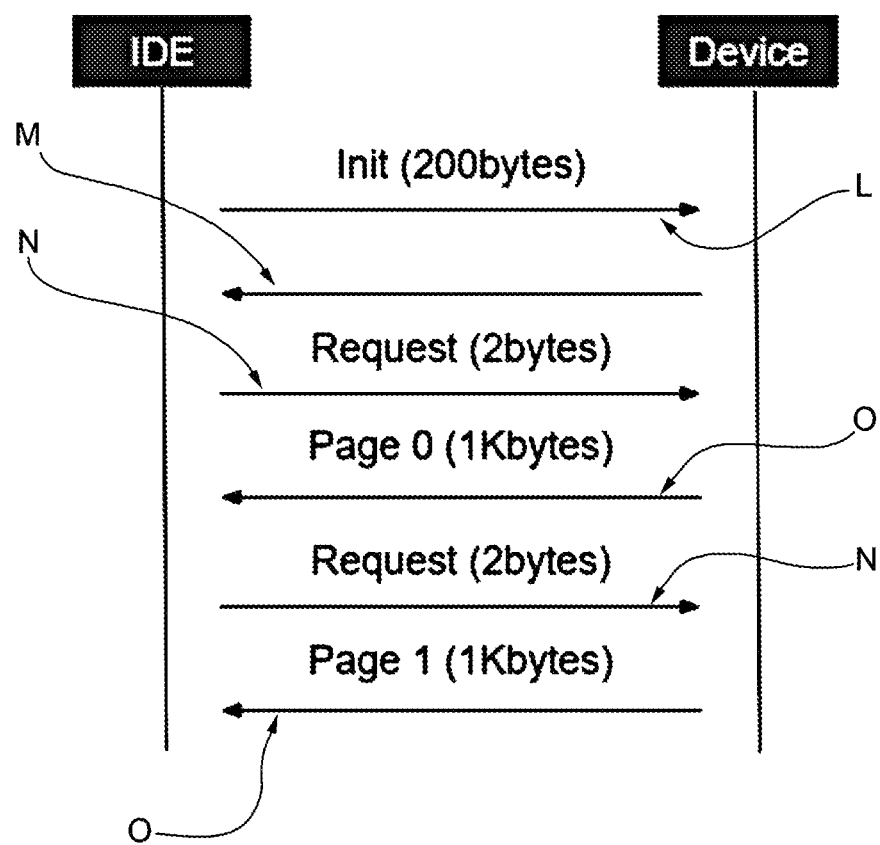
FIG. 4 shows a simplified diagram of an example of a preliminary setting step of a testing method according to the present invention.

With particular reference to FIG. 4, the testing method, according to one aspect of the present invention, may further comprise a preliminary setting step which precedes the recording step 100 and which involves:

an operation L where the controller (which in FIG. 4 is indicated by the reference "Device") is interrogated by the diagnostic unit (which in FIG. 4 is indicated by the reference "IDE") regarding the addresses and the size of said data;

an operation M of transmitting, from the controller to the diagnostic unit, the addresses and the size of the data in said memory.

The operation F and the operation J may each involve:

an operation N where the diagnostic unit requests the controller to transmit the data contained said memory to the addresses and with the sizes received in the preliminary setting step;

an operation O where the data requested in operation N is transmitted by the controller to the diagnostic unit.

In this way it is possible ensure the particularly efficient transmission of data between the controller and the diagnostic unit, limiting to the preliminary setting step the communication, from the controller to the diagnostic unit, of the information relating to the addresses and the size of the data to be transferred, which information may for example employ 200 bytes.

Thus, the request for data in operations F and J, by the diagnostic unit to the controller, and the transmission of the requested data from the latter to the former, may employ, respectively, 2 bytes for the request and 1 Kbyte for the response.

The transfer of the aforementioned data may be performed by envisaging that the preliminary setting step may comprise the organization of said data in a plurality of pages.

The operation N and the operation O may, in this respect, involve respectively the requesting and the transmission of one of said pages, operations N and O being carried out cyclically until the transmission of all the pages from the controller to the diagnostic unit is completed.

With the present testing method it is therefore possible to perform effective and efficient testing also in the case where the controller has a limited hardware capacity as in the case where it has a RAM with a capacity substantially of between 32 KB and 256 KB and/or a ROM with a capacity substantially of between 128 KB and 2048 KB and with a CPU clock of between 20 MHz and 200 MHz with serial communication port.

The recording step 100 and/or the execution step 200 may each comprise a standby step 300.

The standby step 300 consists in a delay in starting of the cycle of operations D-F and/or H-K and, in general, depending on the type of refrigerating machine, may also not be present.

In some cases it may coincide with the activation time of the refrigerating machine with an initial transient period which is not considered to be significant for the purposes of the recording or execution operations.

It can be understood, therefore, how a testing method according to the present invention has the following special features:

1) it allows virtualization of the inputs during the execution step; this enables forcing, in real time, of the values acquired during the recording step in order to replicate the system behaviour;
2) it has a particularly efficient communication protocol capable of ensuring real-time data acquisition and handling; this is achieved in particular by transferring only the data of interest, specifying memory sizes and addresses before the start of the recording step and checking the timing by means of a command which controls the number of control cycles;
3) it allows automatic recognition of the I/O configuration and acquisition of the initial conditions associated with the status variables at the start of the recording step, so as to ensure reversion of the system to the same conditions at the beginning of the recording step;
4) it allows temporal alignment of the data recorded in the recording step with the data recorded in the execution step by calculating the number of control cycles, thus making the testing method independent of any changes in the duration of the control cycle time T; in other words, it provides a cyclical control system which is set on the basis of discrete times, with stable inputs during control, allowing the same set of input values to be applied in the corresponding time instants during execution, something which would not be possible with continuous control or with variable inputs during control.

The invention claimed is:

1. A method for testing the functional stability of a controller of a refrigerating machine wherein said controller, for which status variables are set and which has inputs for input variables and outputs for output variables, carries out control cycles which involve, in sequence, the following operations:

A acquiring values of said input variables, which represent functional conditions of the refrigerating machine, B executing a control algorithm which, on the basis of the values of said input variables and of said status variables, sets values for said output variables so as to control operation of the refrigerating machine;

C repeating operations A and B following lapsing of a control cycle time T from the start of operation A;

said testing method involving an operation of connecting said controller to a diagnostic unit for exchanging data during the operation of said controller;

said testing method comprising, during the operation of said refrigerating machine, a recording step (100) and a subsequent execution step (200), which are carried out by said diagnostic unit;

wherein said recording step (100) involves in sequence:

an operation D which is carried out following said operation B and which involves associating, with a recording cycle identifier IDR, a progressive value calculated starting from a start cycle, which is the control cycle of said controller in which said recording step (100) is started;

an operation F of recording a set of reference data, which consists of a set of current values of said input variables, said status variables and said output variables; said recording step (100) further involving associating with each reference data set the recording cycle identifier IDR of the control cycle in which said reference data set was recorded;

repeating said operation D and said operation F for each control cycle until the end of said recording step (100);

wherein said execution step (200) involves in sequence:

an initialization operation H in which, during the execution of said operation A, the current values received by said controller for said input variables and for said status variables are replaced by the values of said input variables and said status variables of the reference data set which was recorded in the operation F carried out in said start cycle;

wherein the control cycle in which the operation H is performed is assumed as an initialization cycle;

an operation I of recording an execution cycle identifier IDE which involves associating with said execution cycle identifier IDE a progressive value calculated starting from said initialization cycle;

an operation J of recording, following operation B, a control data set, which comprises a set of current values of said output variables; wherein said execution step (200) also involves associating with each control data set the execution cycle identifier IDE in which said control data set was recorded;

a write operation K, in which the values of the input variables of the reference data set which was recorded in operation F carried out in the control cycle having a recording cycle identifier IDR directly following the execution cycle identifier IDE recorded in said operation I are assigned to the values of said input variables, in such a way that, in operation A of the subsequent control cycle, the values of said input variables are those assigned in said operation F;

repeating said operation I, said operation J and said operation K for each control cycle until the end of said execution step (200).

2. The testing method according to claim 1 which comprises a comparison step in which the following are compared:

the values of the output variables recorded in said operation F of said recording step (100) and the values of the output variables recorded in said operation K of said execution step (200);

wherein such comparison is made between said values of the output variables recorded in said operation F associated with a control cycle identifier IDR which is equal to the execution cycle identifier IDE associated with said output variable values recorded in said operation K.

3. The testing method according to claim 1, wherein said controller comprises a memory in which, in each control cycle, data relating to said input variables and to said status variables is stored, said data having sizes and addresses in said memory which remain fixed during said control cycles; said testing method further comprising a preliminary setting step which precedes said recording step (100) and which involves:

an operation L where said controller is interrogated by said diagnostic unit regarding the addresses and size of said data;

an operation M of transmitting, from said controller to said diagnostic unit, the addresses and the size of said data in said memory;

wherein said operation F and said operation J each involve:

an operation N where said diagnostic unit requests said controller to transmit the data contained in said memory to the addresses and with the sizes received in said preliminary setting step;

an operation O where the data requested in said operation N is transmitted by said controller to said diagnostic unit.

4. The testing method according to claim 3, wherein said preliminary setting step involves the organization of said data in a plurality of pages; said operation N and said operation O involving respectively the requesting and the transmission of one of said pages; said operations N and O being carried out cyclically until the transmission of all said pages from said controller to said diagnostic unit is completed.

5. The testing method according to claim 1, wherein said controller has a RAM with a capacity substantially of between 32 KB and 256 KB, and preferably between 128 KB and 192 KB, a ROM with a capacity substantially of between 128 KB and 2048 KB and preferably between 512 KB and 1536 KB and a CPU clock of between 20 MHz and 200 MHz and preferably of between 80 MHz and 120 MHz with serial communication port.

6. The testing method according to claim 2, wherein said controller comprises a memory in which, in each control cycle, data relating to said input variables and to said status variables is stored, said data having sizes and addresses in said memory which remain fixed during said control cycles; said testing method further comprising a preliminary setting step which precedes said recording step (100) and which involves:

an operation L where said controller is interrogated by said diagnostic unit regarding the addresses and size of said data;

an operation M of transmitting, from said controller to said diagnostic unit, the addresses and the size of said data in said memory;

wherein said operation F and said operation J each involve:

an operation N where said diagnostic unit requests said controller to transmit the data contained in said memory to the addresses and with the sizes received in said preliminary setting step;

an operation O where the data requested in said operation N is transmitted by said controller to said diagnostic unit.

7. The testing method according to claim 6, wherein said preliminary setting step involves the organization of said data in a plurality of pages; said operation N and said operation O involving respectively the requesting and the transmission of one of said pages; said operations N and O being carried out cyclically until the transmission of all said pages from said controller to said diagnostic unit is completed.

8. The testing method according to claim 2, wherein said controller has a RAM with a capacity substantially of between 32 KB and 256 KB, and preferably between 128 KB and 192 KB, a ROM with a capacity substantially of between 128 KB and 2048 KB and preferably between 512 KB and 1536 KB and a CPU clock of between 20 MHz and 200 MHz and preferably of between 80 MHz and 120 MHz with serial communication port.

9. The testing method according to claim 3, wherein said controller has a RAM with a capacity substantially of between 32 KB and 256 KB, and preferably between 128 KB and 192 KB, a ROM with a capacity substantially of between 128 KB and 2048 KB and preferably between 512 KB and 1536 KB and a CPU clock of between 20 MHz and 200 MHz and preferably of between 80 MHz and 120 MHz with serial communication port.

10. The testing method according to claim 4, wherein said controller has a RAM with a capacity substantially of between 32 KB and 256 KB, and preferably between 128 KB and 192 KB, a ROM with a capacity substantially of between 128 KB and 2048 KB and preferably between 512 KB and 1536 KB and a CPU clock of between 20 MHz and 200 MHz and preferably of between 80 MHz and 120 MHz with serial communication port.

11. The testing method according to claim 6, wherein said controller has a RAM with a capacity substantially of between 32 KB and 256 KB, and preferably between 128 KB and 192 KB, a ROM with a capacity substantially of between 128 KB and 2048 KB and preferably between 512 KB and 1536 KB and a CPU clock of between 20 MHz and 200 MHz and preferably of between 80 MHz and 120 MHz with serial communication port.

12. The testing method according to claim 7, wherein said controller has a RAM with a capacity substantially of between 32 KB and 256 KB, and preferably between 128 KB and 192 KB, a ROM with a capacity substantially of between 128 KB and 2048 KB and preferably between 512 KB and 1536 KB and a CPU clock of between 20 MHz and 200 MHz and preferably of between 80 MHz and 120 MHz with serial communication port.

* * * * *